United States Patent [19]

Wilson et al.

[11] 4,062,980
[45] Dec. 13, 1977

[54] HUMIDIFYING AND SHIRRING EDIBLE COLLAGEN SAUSAGE CASING

[75] Inventors: John R. Wilson; Noel I. Burke, both of Danville, Ill.

[73] Assignee: Teepak, Inc., Chicago, Ill.

[21] Appl. No.: 669,074

[22] Filed: Mar. 22, 1976

[51] Int. Cl.$^2$ .............................................. A23L 11/13
[52] U.S. Cl. ....................................... 426/278; 17/49; 426/506; 426/138
[58] Field of Search .................. 426/92, 105, 135, 140, 426/277, 278, 297, 302, 310, 312, 315, 321, 420, 506, 514; 17/42, 49, 51; 138/118.1

[56] References Cited

U.S. PATENT DOCUMENTS

| 3,222,192 | 12/1965 | Arnold | 17/49 |
|---|---|---|---|
| 3,262,789 | 7/1966 | Broumand | 426/420 |
| 3,818,947 | 6/1974 | Rose | 426/135 |
| 3,981,046 | 9/1976 | Chiu | 17/49 |

*Primary Examiner*—Norman Yudkoff
*Assistant Examiner*—Martin G. Mullen
*Attorney, Agent, or Firm*—Paul Shapiro; Joseph E. Kerwin; William A. Dittmann

[57] ABSTRACT

This invention relates to an improvement in a process for preparing humidified, shirred artificial collagen sausage casings wherein immediately prior to shirring, the inside wall of the unshirred portion of the casing is contacted with an aqueous humidifying fluid comprised of water containing from about 0.8 to about 3% by weight of a mixture of partial fatty acid esters of glycerine and sorbitol, the glycerine ester being present in the aqueous fluid at a concentration of greater than 0.1% by weight.

6 Claims, No Drawings

HUMIDIFYING AND SHIRRING EDIBLE COLLAGEN SAUSAGE CASING

BACKGROUND OF THE INVENTION

1. Field of the Invention

This invention relates to the manufacture of edible food casings derived from animal hide collagen and particularly to an improved method of humidifying the casings to render them amenable to shirring.

2. The Prior Art

Artificial sausage casings made of collagen have achieved wide success as a synthetic substitute for edible natural casings in the processing of sausages.

In the manufacture of collagen casings, the casings are extruded from a slurry of comminuted bovine hide derived collagen in the form of continuous tubing. For convenience of handling and shipping, the artificial sausage casings are shirred, from lengths ranging from 40–80 feet to a compacted length of a few inches, e.g., 6–10 inches using shirring machines of the type generally used in the shirring of cellulosic sausage casings. Typical shirring machines are shown in U.S. Pat. No. 2,722,714 2,722,715, 2,723,301, 3,122,517, 3,222,192, and 3,451,827.

The extruded casings generally have moisture contents in the range of 15–20%. In order to shirr these casings and to utilize these casings at the time of stuffing by the meat processor, the casings require higher moisture contents, i.e., moisture contents in the range of 20–26%. When the moisture content of the collagen casings is below the aforementioned required ranges, the casings are brittle and will very often fracture during their use by the meat processor. Thus, when the casings are stuffed, twisted and linked by the meat processor, if the casings are not adequately humidified, splitting at the shoulder portion of the meat filled casing will occur during twisting to prepare sausage links. This phenomenon is referred to in the art as "linker breakage" and if the linker breakage exceeds 2–3%, the casings are unacceptable for use.

It is a practice in the cellulosic food casing art to raise the moisture content of the casings to render them amenable to shirring and stuffing by internally humidfying the casings while simultaneously lubricating the casing on a shirring machine by spraying a stream of water and a separate stream of lubricant onto the walls of the casing through the shirring mandrel. Humidification has been also accomplished by spraying water onto the shirring wheels or shirring belts and then causing these wheels or belts to contact the external surface of the casing. It has been proposed in these processes to add wetting agents in a proportion of from about 0.02–0.04% by weight of the solution to enhance the rate of wetting of the casing. It has also been suggested to humidify cellulosic casings after they have been shirred by spraying a mixture of water and lubricant over the surface of the shirred casing. The lubricants used in the mixture are generally aqueous emulsions of vegetable, animal or refined oils.

Although these humidification methods have been effective for the humidification of cellulosic casings, attempts to employ these methods for the humidification of collagen casings have not been entirely successful.

SUMMARY OF THE INVENTION

In accordance with the present invention, there is provided a process for humidifying and shirring artificial collagen sausage casings whereby linker breakage during stuffing is materially reduced, the process involving passing the casing over a shirring mandrel, and immediately prior to shirring, humidification of the casing is effected by applying to the internal wall of the casing an aqueous dispersion containing from about 0.8 to about 3% by weight of a mixture of the partial fatty acid esters of glycerine and sorbitol, the glycerine ester beng present in the aqueous dispersion at a concentration of more than 0.1% by weight.

By the practice of the present invention, humidified artificial sausage casings derived from animal hide collagen are produced with greater elasticity to prevent breakage during stuffing.

PREFERRED EMBODIMENTS

The partial fatty acid esters of glycerine and sorbitol preferred in the practice of the present invention are the partial oleic acid esters of glycerine and sorbitol.

The partial oleic acid esters of glycerine are available commercially as mixtures of mono-and diglycerides from the Glidden-Durkee Division of SCM under the trademark GMO. GMO is composed of 55% by weight of the monoglyceride of oleic acid, 35% of the diglyceride of oleic acid and the balance consisting essentially of the triglyceride of oleic acid.

The partial fatty acid esters of glycerine must be present in the aqueous humidifying fluid at a concentration in excess of 0.1% by weight. As will hereinafter be illustrated, the incorporation of 0.1% by weight of the partial fatty acid ester of glycerine in the humidification fluid causes an undesirable increase in the linker breakage encountered during the stuffing of the casing. Generally, the amount of the partial fatty acid ester of glycerine incorporated in the humidification medium should be in the order of about 0.12% to 1.0% by weight. Although concentrations of the partial fatty acid ester of glycerine in excess of 1% by weight may be incorporated in the humidification fluid such excess amounts will have little effect in improving the resistance of the collagen casing to breakage during the stuffing and linking operations performed by the meat processor. When the concentration of the partial fatty acid ester of glycerine in the humidification medium is in the range of 0.15% to 1.0% by weight, upon application to the internal walls of the casing during normal collagen strand shirring opeations, this concentration range yields about 0.01 to 0.10 milligrams (mg) of the glycerine ester per square inch ($in^2$) of casing surface.

The sorbitan fatty acid ester is included in the humidification fluid in a proportion of from about 0.5 to about 2% by weight and preferably from about 0.8 to 1.5% by weight. As a rule of thumb, as the proportion of mixed glycerine mono-and diester is reduced toward the lower amount in the humidification fluid, e.g., 0.2% by weight, then the proportion of partial fatty acid ester of sorbitan is increased toward the upper amount. Likewise, where the proportion of partial fatty acid ester of sorbitan, e.g., sorbitan trioleate, is reduced toward the lower amount, e.g., 0.5%, the proportion of mixed glycerine ester is increased toward the upper amount, e.g., 1%. The sorbitan ester is applied to the internal casing walls at levels of from 0.04 to 0.10 mg/$in^2$ of casing surface.

Thus, the aqueous fluid used for humidification of the collagen casing is an aqueous dispersion containing from about 0.12 to about 1.0% by weight of the glycerine mixed ester, and about 0.5 to about 2% by weight of the partial fatty acid ester of sorbitan and the balance is essentially water, and the aqueous dispersion is applied at desired levels to the internal walls of the collagen casing immediately before shirring to enhance the elasticity of the casing required during meat stuffing operations.

The humidification fluid should be applied to the casing prior to shirring and a number of ways are suited. One of the better ways of introducing the humidification fluid to the interior of the collagen casing prior to shirring is during the actual shirring process. The apparatus described in U.S. Pat. No. 3,451,827 is well suited for accomplishing application of the humidification of the casing prior to shirring. This apparatus is provided with a spray system for applying the humidification fluid to the inner wall of the casing immediately before contact of the casing with the shirring wheels of the apparatus.

The following examples are provided to illustrate the practice of the present invention and are not intended to restrict the scope thereof. All percentages are expressed as weight percentages.

EXAMPLE 1

Artificial sausage casings extruded from collagen were humidified during the shirring process by employing the apparatus described in U.S. Pat. No. 3,451,827 using a spray system for applying the fluid to the inner wall of the casing.

The humidification fluid was prepared by dispersing 1% sorbitan trioleate and 0.2% GMO in a water solution. A reel of dry, i.e., 14% water, collagen casing flat stock having a diameter of 21 mm. and a wall thickness of about 1.2–1.4 mils was introduced over the shirring mandrel and shirred. As the casings passed over the mandrel, the inner wall of the casing was contacted with a fine spray of the aqueous dispersion at a rate of 8cc/strand. At this application rate, the inner walls of the casing had applied thereto about 7.8 mg./in² of the aqueous dispersion. The shirred strand of casing contained 40 feet of casing and the internal walls of the casing contained about 0.06 to about 0.07 mg./in² sorbitan trioleate and about 0.013 to 0.015 mg./in² GMO. The moisture content of the casing was about 24%.

The casing shirred very smoothly. The casings performed well when stuffed and linked and a linker breakage of 0.94% was observed when the casings were stuffed and linked by a meat processor.

For purposes of contrast the procedure of Example 1 was repeated, with the exception that sorbitan trioleate and GMO were not dispersed in the water spray. The shirred casing when stuffed and linked was determined to have a linker breakage of 2.20%.

EXAMPLE 2

In a second test a shirred strand of collagen casing was prepared by spraying a humidification fluid consisting of 1% sorbitan trioleate and 0.2% GMO in water onto the inner wall of the casing following the procedure of Example 1. The sorbitan trioleate was present in a proportion of about 0.07 mg. per square inch of casig and the GMO was present at about 0.014 mg./in² of casing and the moistue content of the casing was raised to about 24% by weight.

For purposes of contrast, the procedure of Example 2 was repeated in a series of runs with the exception that in one run only 1% sorbitan trioleate was incorporated in the humidifying fluid, in a second run, 1% sorbitan trioleate and 0.1% GMO were incorporated in the humidifying fluid and in a third run, the adjuvants added to the humidifying fluid were 2.5% sorbitan trioleate and 1% carboxymethylcellulose (CMC).

The linker breakage during stuffing and linking by a meat processor of the collagen strands humidified in accordance with Example 2 as well as in the contrasting runs was observed and recorded. The linker breakage of these strands is summarized in the Table below.

TABLE

| Test No. | Adjuvant(s) Added To Humidification Fluid | Linker Breakage % |
|---|---|---|
| 1 | 1% Sorbitan Trioleate + 0.2% GMO | 0.09 |
| 2 | 1% Sorbitan Trioleate + 0.1% GMO | 6.00 |
| 3 | 1% Sorbitan Trioleate | 2.30 |
| 4 | 2.5% Sorbitan Trioleate + 1% CMC | 2.40 |

By reference to the Table, it is immediately apparent that collagen casings humidified in accordance with the present invention encounter substantially less linker breakage when linked and stuffed (Test No. 1) especially when compared to collagen casings humidified with aqueous dispersions containing adjuvants outside the scope of the present invention (Test Nos. 2-4).

What is claimed is:

1. In a process for humidifying an artificial collagen sausage casing during shirring wherein an aqueous humidification fluid is applied to the inside wall of the unshirred casing and the casing subsequently shirred, the improvement which comprises dispersing in the aqueous fluid about 0.8–3% by weight of a mixture of the partial fatty acid esters of glycerine and sorbitol, the glycerine ester being present in the aqueous fluid at a concentration of more than 0.1% by weight and the mixture is applied to the casing in a proportion to provide from about 0.01 to about 0.10 mg./in² of the glycerine ester on the internal wall of the casing and about 0.04 to 0.10 mg./in² of the sorbitol ester on the internal wall of the casing.

2. The process of claim 1 wherein the partial fatty acid esters are the oleic acid esters.

3. The process of claim 1 wherein the sorbitol ester is sorbitan trioleate.

4. The process of claim 3 wherein the concentration of the sorbitan trioleate in the aqueous liquid is in the range from about 0.8–1.5% by weight.

5. The process of claim 1 wherein the glycerine ester is a mixture of mono-and diglycerides.

6. The process of claim 5 wherein the concentration of the glycerine ester in the aqueous liquid is in the range of 0.12 to 1% by weight.

* * * * *